E. HARMER.
PNEUMATIC MACHINERY CLEANER.
APPLICATION FILED JAN. 2, 1907.
931,757.
Patented Aug. 24, 1909.
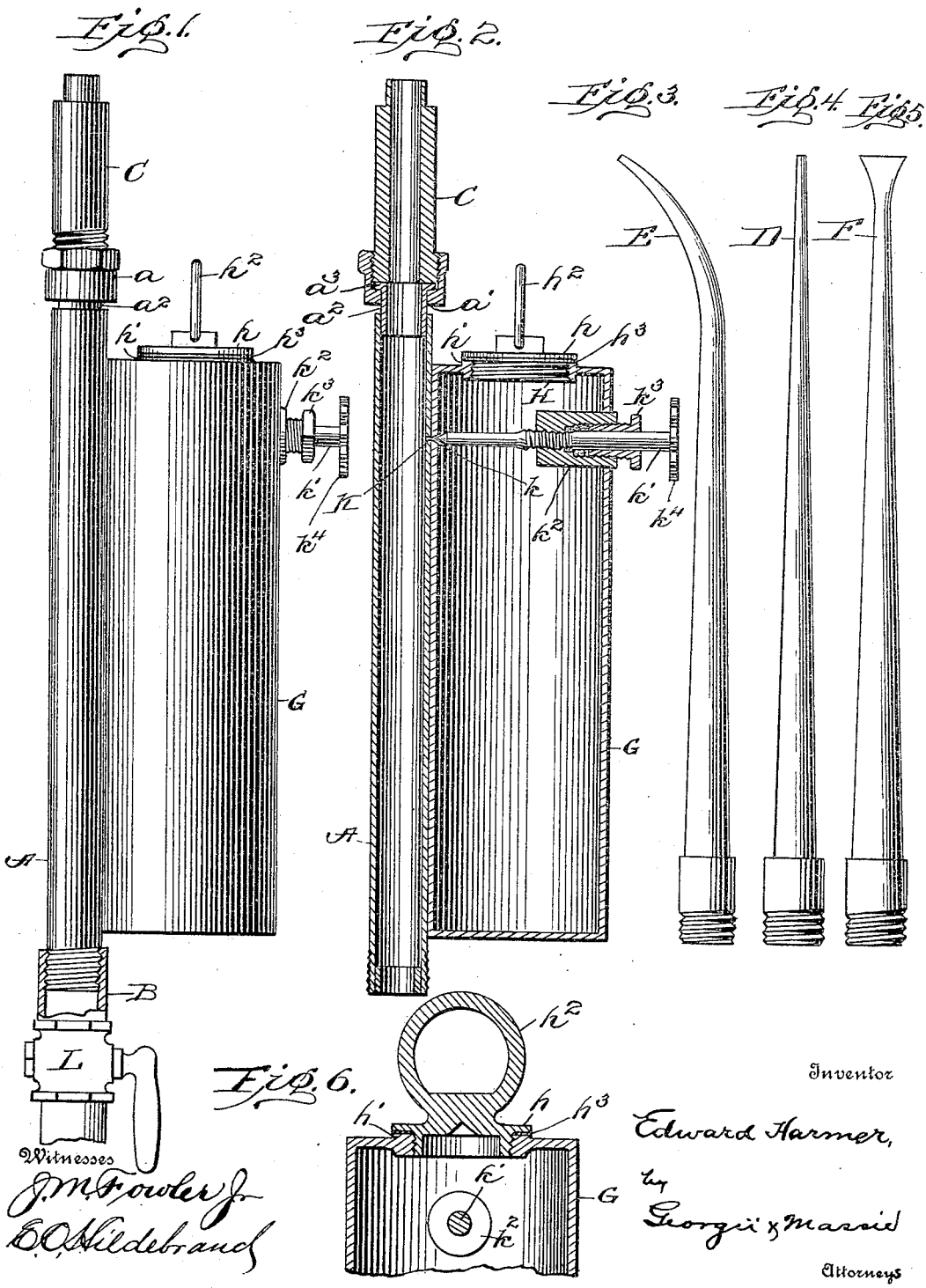

UNITED STATES PATENT OFFICE.

EDWARD HARMER, OF OTTAWA, ONTARIO, CANADA, ASSIGNOR TO PNEUMATIC MACHINERY CLEANER COMPANY, A COPARTNERSHIP OF NEW YORK.

PNEUMATIC MACHINERY-CLEANER.

931,757.     Specification of Letters Patent.     Patented Aug. 24, 1909.

Application filed January 2, 1907. Serial No. 350,453.

*To all whom it may concern:*

Be it known that I, EDWARD HARMER, citizen of Canada, residing at Ottawa, Ontario, Canada, have invented certain new and useful Improvements in Pneumatic Machinery-Cleaners; and I do hereby declare the following to be a full, clear, and exact description of the invention, such as will enable others skilled in the art to which it appertains to make and use the same.

My invention relates to improvements in cleaning devices, and in particular to a pneumatic machinery cleaner.

The object of my invention is to provide a device particularly adapted for cleaning off oil and dirt from machinery.

With this general object in view, my invention consists in the features, details of construction and combination of parts which will first be described in connection with the accompanying drawings and then particularly pointed out in the claims.

In the drawings Figure 1 is a side elevation of the device with one nozzle in place; Fig. 2 a longitudinal section of the same; Figs. 3 4 and 5 views showing in elevation other forms of nozzles which may be used with my invention, and Fig. 6 a detail sectional view of the closure device employed by me.

Referring to the drawings, A is a pipe arranged to be connected at one end to a supply of compressed air, as, for example, by connecting the end of the pipe with a hose B supplying compressed air from any suitable source, not shown. The other end of said pipe A is arranged to be connected with and carry any one of a series of nozzles, indicated at C, D, E and F. In order to permit of a ready interchange of these various nozzles, the outer end of the pipe A is provided with a socket, $a$ internally threaded and adapted to engage the exteriorly threaded inner ends of the respective nozzles. In my device, this socket $a$ is made in a special manner in order to provide a tight joint between the pipe and nozzle. The socket $a$ is loosely mounted with respect to the pipe so as to be rotatable with relation to the pipe A and at the same time to be movable to a limited extent in an axial direction. This is accomplished by flanging inward the inner edge of the socket $a$, as shown at $a'$, Fig. 2, and through the rear end of this socket projects a nipple $a^2$ having an outward extending flange $a^3$. The nipple $a^2$ is inserted inward through the socket $a$ and is then secured in the outer end of the pipe A, as for example, by soldering the nipple in the said pipe, a space being left between the rear end of the socket and the front end of the pipe A so that the socket can have a limited amount of play in an axial direction.

Each nozzle is somewhat enlarged at its inner screw-threaded end so that it will fit the socket, and also have a good bearing surface against the outer face of the nipple flange. The contacting surfaces of the said flange and the inner ends of the nozzle may be ground to form a perfect joint.

In the drawings, I have illustrated a short plain nozzle, C, adapted to discharge a relatively large stream of compressed air, a long tapering nozzle D arranged to enter small openings and discharge a small stream of air in the direction of the axis of the pipe A, a long tapering bent nozzle, E, arranged to discharge a small stream at an angle to the axis of the pipe A, and a nozzle F arranged to discharge a wide but thin stream of air. By means of the particular connection disclosed by me, not only may the nozzles be readily interchanged, but also, when nozzles which discharge at an angle to the axis of the pipe A, such as the nozzle E, are employed, such nozzles may be rotated axially to discharge in any direction while maintaining a tight joint between the pipe A and the nozzle.

To one side of the pipe A is secured a receiver G for a cleansing fluid, such as benzin, alcohol, alkaline or acid solutions and the like. In the present example, this receiver G is shown as cylindrical and is attached to the pipes A by soldering. This receiver has one end permanently closed, and the other end, which may be called the upper end is provided with a central opening closed by a removable closure device, as for example, a screw-threaded plug H having a flanged edge $h$ arranged to bear against the upper edge of an annular flange $h'$ formed on the upper end of the receiver. The plug H is provided with any suitable means by which it may be turned, as for example, the ring handle $h^2$. The flanges $h$ and $h'$ are intended to make a tight contact with each other so as to form a fluid tight joint. However, if desired, a packing ring may be used between them as indicated at $h^3$, Fig. 6.

A passage way K is formed between the interior of the receiver G and the interior of the pipe A, this passage way being placed near to the upper end of the receiver G, so as to be accessible through the opening in the upper end of the receiver, which is made of such a size that in case the said passage becomes obstructed, it is only necessary to remove the plug or closure H and insert a wire through the opening and into the said passage K to clear the latter. This can be done without entirely emptying the receiver, as will be obvious from the drawings. The inner end of the passage K is coned to form a valve-seat, as indicated at $k$, and opposite this seat is arranged a needle valve $k'$ extending through a bushing $k^2$, formed in the wall of the receiver G and provided with a packing gland $k^3$. The needle valve is screw-threaded through the said bushing $k^2$ and is provided outside the receiver G with a device for permitting the ready rotation of the said needle-valve to screw or unscrew it, as for example, the hand wheel $k^4$. The packing gland $k^3$ is of the usual construction and prevents leakage of the cleansing fluid around the needle valve. When the said needle valve $k'$ is screwed down against its seat $k$, it effectually closes the passage K and prevents escape of the cleaning fluid into the pipe A. Owing to the conical form of the seat $k$ and the valve $k'$, the amount of flow through the passage K may be readily adjusted by turning the hand wheel $k^4$, which is convenient to the hand of the operator.

The operation of my device is as follows: The receiver being held with its closure upward, the latter is opened and the needle valve closed. The receiver is then filled with the required cleansing fluid preferably to a level just below the valve and passage way K. The closure is then replaced. The desired nozzle being put in place and the pipe A being supplied with compressed air, the operator may insert the nozzle into the desired place in the machinery to be cleaned and if necessary, can allow the compressed air alone to act on the place to be cleaned, or if necessary, may open the needle valve and thus allow the cleaning fluid to flow through the passage way K and mingle with the stream of compressed air which thereby delivers it to the place to be cleaned, thus dissolving and washing away any dirt or other matter to be removed. In this way, the machinery may be rapidly cleaned and at parts hitherto inaccessible or accessible only with difficulty. I have found the device of particular value for cleaning type setting machinery.

A suitable valve may be employed for controlling the supply of compressed air. In the drawing, I have shown a valve for this purpose located in the hose, as indicated at L.

Having thus described my invention, what I claim as new and desire to secure by Letters Patent, is:—

1. In a device for cleaning machinery, the combination, with a cylindrical receiver open at one end, and a pipe arranged parallel with the receiver and having one side in direct contact with the side of said receiver, said receiver and pipe having a lateral passage-way leading from the receiver to the pipe near the open end of the receiver and accessible from said open end, of a bushing in the wall of the receiver opposite the said passage-way, a needle valve threaded into said bushing, arranged to close the passage-way and provided with a handle outside the receiver, a nozzle for the end of the pipe adjacent the open end of the receiver, and a closure for said open end of the receiver.

2. In a device for cleaning machinery, the combination, with a pipe, and a nozzle connected thereto, of a receiver open at its upper end and provided with a passage-way near its upper end leading to the pipe, a closure for said upper end of the receiver, a needle valve having a stem passing through the wall of the receiver and arranged to control the passage way, and a handle on the stem of the needle-valve outside the receiver.

3. In a device for cleaning machinery, the combination, with a pipe and a nozzle connected thereto, of a receiver open at its upper end and provided with a passage-way near its upper end leading to the pipe, said passage-way having a conical portion serving as a valve seat, a closure for the said upper end of the receiver, a bushing provided with a packing gland and secured to the receiver wall opposite the passage-way, and a needle-valve passing through said packing gland, threaded through the bushing and provided with a coned point arranged to contact with the coned portion of the passage-way.

4. In a device for cleaning machinery, the combination, with a pipe and a receiver connected thereto and arranged to supply a cleaning fluid to the interior of the pipe, of a socket provided with an interior screw-thread and an inward extending flange, a nipple flanged at one end, extending through the socket and secured at its other end to the pipe, and a nozzle provided with an enlarged screw-threaded end arranged to enter the socket and to contact with the outer end of the nipple.

In testimony whereof I hereunto affix my signature in the presence of two witnesses.

EDWARD HARMER.

Witnesses:
    PETER F. MCEWEN,
    T. E. ARMSTRONG.